United States Patent
Zhao et al.

(10) Patent No.: US 11,693,701 B2
(45) Date of Patent: Jul. 4, 2023

(54) SYSTEM SERVICE TIMEOUT PROCESSING METHOD, AND APPARATUS

(71) Applicant: Huawei Technologies Co., Ltd., Shenzhen (CN)

(72) Inventors: Junmin Zhao, Beijing (CN); Yu Li, Beijing (CN); Sen Wang, Shenzhen (CN); Shun Xu, Shanghai (CN); Zhenchao Lin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 448 days.

(21) Appl. No.: 16/651,909

(22) PCT Filed: Sep. 30, 2017

(86) PCT No.: PCT/CN2017/104795
§ 371 (c)(1),
(2) Date: Mar. 27, 2020

(87) PCT Pub. No.: WO2019/061407
PCT Pub. Date: Apr. 4, 2019

(65) Prior Publication Data
US 2020/0264933 A1   Aug. 20, 2020

(51) Int. Cl.
*G06F 9/46* (2006.01)
*G06F 9/50* (2006.01)
*G06F 9/48* (2006.01)

(52) U.S. Cl.
CPC .......... *G06F 9/5022* (2013.01); *G06F 9/4812* (2013.01); *G06F 9/5083* (2013.01)

(58) Field of Classification Search
CPC ..... G06F 9/5022; G06F 9/4812; G06F 9/5083
See application file for complete search history.

(56) References Cited

U.S. PATENT DOCUMENTS 9,164,823 B2   10/2015   Yamashita et al.
9,274,894 B1 *  3/2016   Perry ................... G06F 11/0706
(Continued)

FOREIGN PATENT DOCUMENTS

CN   101539878 A   9/2009
CN   101996106 A   3/2011
(Continued)

OTHER PUBLICATIONS

Anonymous, "Watchdog Mechanism and Problem Analysis", Retrieved from: https://duanqz.github.io/2015-10-12-Watchdog-Analysis, dated Oct. 12, 2015, 41 pages.
(Continued)

*Primary Examiner* — Tammy E Lee
(74) *Attorney, Agent, or Firm* — Huawei Technologies Co., Ltd.

(57) ABSTRACT

Embodiments of this application relate to the field of communications technologies, and provide a system service timeout processing method and an apparatus. The method includes: when a target system service thread in at least one system service thread times out, determining, by a terminal, a first application process communicating with the target system service thread, where the timeout of the target system service thread includes at least one of the following: a locked object occupied by the target system service thread is not released within a preset time, and the target system service thread is blocked; and ending, by the terminal, the first application process.

18 Claims, 7 Drawing Sheets

(56) References Cited

U.S. PATENT DOCUMENTS

| | | | |
|---|---|---|---|
| 10,051,019 B1* | 8/2018 | Jasso | G06F 5/00 |
| 2006/0059287 A1 | 3/2006 | Rivard et al. | |
| 2007/0220294 A1 | 9/2007 | Lippett | |
| 2012/0066484 A1 | 3/2012 | Yin et al. | |
| 2014/0137183 A1 | 5/2014 | Russello et al. | |
| 2016/0139966 A1 | 5/2016 | Greco | |
| 2017/0228273 A1* | 8/2017 | Bikumala | G06F 11/079 |

FOREIGN PATENT DOCUMENTS

| | | |
|---|---|---|
| CN | 102253863 A | 11/2011 |
| CN | 102984580 A | 3/2013 |
| CN | 103077052 A | 5/2013 |
| CN | 103425225 A | 12/2013 |
| CN | 103942113 A | 7/2014 |
| CN | 105677501 A | 6/2016 |
| CN | 105824622 A | 8/2016 |
| CN | 106406947 A | 2/2017 |
| CN | 106445712 A | 2/2017 |
| CN | 106445721 A | 2/2017 |
| CN | 106681822 A | 5/2017 |
| CN | 106951318 A | 7/2017 |
| JP | 2004213547 A | 7/2004 |
| JP | 2008003770 A | 1/2008 |
| JP | 2010152838 A | 7/2010 |
| JP | 2011175570 A | 9/2011 |
| JP | 2013114359 A | 6/2013 |
| KR | 100495367 B1 | 6/2005 |
| KR | 100691120 B1 | 3/2007 |
| WO | 0150263 A1 | 7/2001 |
| WO | 2012066622 A1 | 5/2012 |

OTHER PUBLICATIONS

Anonymous, "Binder Series 10-Summary", Retrieved from: http://gityuan.com/2015/11/28/binder-summary/, Nov. 28, 2015, 13 pages.

Anonymous, "Binder Series 7—Framework Layer Analysis", Retrieved from: http://gityuan.com/2015/11/21/binder-framework, Nov. 21, 2015, 68 pages.

Shin, M. et al., "Privacy Preserving Watchdog System in Android Systems", IEEE, 2017 International Conference on Platform Technology and Service (PlatCon), Feb. 13-15, 2017, 5 pages.

Huang, Z., "The Mobile Application Research about Services Performance in Cloud Computing Platform", Thesis Submitted to Nanjing University of Posts and Telecommunications for the Degree of Master of Engineering, Feb. 15, 2016, 68 pages.

* cited by examiner

SYSTEM SERVICE TIMEOUT PROCESSING METHOD, AND APPARATUS

CROSS-REFERENCE TO RELATED APPLICATIONS

This application is a National Stage of International Application No. PCT/CN2017/104795, filed on Sep. 30, 2017, which is hereby incorporated by reference in its entirety.

TECHNICAL FIELD

Embodiments of this application relate to the field of communications technologies, and in particular, to a system service timeout processing method and an apparatus.

BACKGROUND

Currently, users have increasingly high requirements on smooth running of terminals such as mobile phones, wearable devices, and tablet computers. However, as more functions can be implemented on the terminal, resources occupied by an application program during running are increasingly fragmented, resulting in frame freezing or even screen freezing when a user uses the terminal, which greatly affects user experience.

A terminal may usually monitor, by using a watchdog (watchdog) mechanism, whether a system service provided in the terminal times out. For example, in an Android system, the watchdog may run as a thread (thread) in a system service (system server) process, and threads of various system services, such as a window manager service (window manager server) and an activity manager system service (activity manager system service), reside in the system server process. The watchdog may monitor these threads in the system server process. If a thread is blocked and the watchdog does not receive a response from the thread within a preset time, the watchdog triggers the terminal to restart the entire Android system.

In other words, once detecting that a thread in a system server is blocked, the watchdog triggers the terminal to restart. This restoration manner through forced blocking causes the user to lose all data in a current scenario, and the user also needs to wait until the terminal restarts.

SUMMARY

Embodiments of this application provide a system service timeout processing method and an apparatus, to reduce a probability of frame freezing or screen freezing on a terminal when a system service times out, and improve user experience.

To achieve the foregoing objectives, the following technical solutions are used in the embodiments of this application.

According to a first aspect, an embodiment of this application provides a system service timeout processing method. A system service process and at least one application process run on a terminal to which the method is applied, and the system service process includes at least one system service thread. Specifically, the method includes: when a target system service thread in the at least one system service thread times out (the timeout of the target system service thread includes at least one of the following: a locked object occupied by the target system service thread is not released within a preset time, and the target system service thread is blocked), determining, by the terminal, a first application process communicating with the target system service thread (especially, the first application process and a second application process are two different application processes in the at least one application process); and ending, by the terminal, the first application process.

In this way, after the first application process is ended, the target locked object occupied by the target system service thread communicating with the first application process can be released, blocking of the target system service thread is eliminated, and another system service thread running on the terminal is not affected. This reduces a probability of frame freezing or screen freezing on the terminal, and improves user experience.

That the target system service thread is blocked may specifically include at least one of the following: duration of communication between the target system service thread and the first application process is greater than a first preset value, and suspension duration of the target system service thread in an execution procedure is greater than a second preset value.

In a possible design method, the system service process further includes a watchdog thread, and the method further includes: sequentially sending, by the watchdog thread, an electrical signal to the foregoing system service threads; and if no response signal fed back by the target system service thread in the foregoing system service threads has been received within the preset time, determining, by the terminal, that the target system service thread times out. In other words, the terminal may implement the system service timeout processing method in this application based on an existing watchdog mechanism, to reduce implementation complexity and save system resources.

In a possible design method, the determining, by the terminal, a first application process communicating with the target system service thread includes: querying, by the terminal from stored registration information, the first application process communicating with the target system service thread, where a correspondence between a system service thread and the first application process that perform IPC is recorded in the registration information.

In a possible design method, after the ending, by the terminal, the first application process, the method includes: restarting, by the terminal, the first application process, so that a user may continue an operation on the restarted first application process.

In a possible design method, the method further includes: The terminal monitors a total quantity N of binder threads that are currently running, where N is an integer greater than or equal to 0. When the total quantity of binder threads is greater than a first preset value, the terminal determines an application process served by each of the N binder threads. Further, the terminal counts a quantity of binder threads occupied by each of all application processes. When a quantity of binder threads occupied by a first target application process is greater than a second preset value, it indicates that the first target application process occupies too many binder resources, resulting in a relatively high risk of frame freezing or screen freezing on the terminal. Therefore, the terminal may end the first target application process, to release the binder threads occupied by the first target application process. The released binder threads may be used by another process (or another thread) waiting for inter-process communication.

In a possible design method, when a quantity of binder threads occupied by a second target application process is greater than the second preset value, a priority of the second target application process is higher than a priority of the first target application process, and the method further includes: ending, by the terminal, the second target application process; and restarting, by the terminal, the second target application process. In other words, when relatively many binder threads are occupied by a plurality of terminals, the terminal may release an application process having a lower priority, and reserve an application process having a higher priority, to avoid that a running status of the terminal and the user experience are affected after the application process having a higher priority is ended (or restarted).

In a possible design method, when the terminal ends the second target application process, the method further includes: recording, by the terminal, a running progress of the second target application process; and the restarting, by the terminal, the second target application process includes: restoring, by the terminal based on the running progress, the second target application process to a running status the same as the running progress. In this way, when restarting the second target application process, the terminal may restore the second target application process to a status before the restart based on the recorded running progress, so that a service is not interrupted before and after the application process is restarted, thereby improving user experience.

In a possible design method, the method further includes: The terminal counts a quantity M of binder threads providing an IPC service for a target application, where M is an integer greater than or equal to 0. When the quantity M of binder threads is greater than or equal to a first threshold, it indicates that there is a potential risk of exhaustion of binder thread resources, and the terminal may stop creating a new binder thread for the target application, to avoid exhaustion of the binder thread resources.

In a possible design method, when the quantity of binder threads is greater than the first threshold, the stopping, by the terminal, creating a new binder thread for the target application includes: The terminal collects statistics about an API invoked by each of the M binder threads. When a quantity of times for which one API is invoked is greater than a second threshold, it indicates that the API is under relatively heavy load, and a risk that the binder thread maliciously invokes the API may exist. In this case, a relatively large quantity of binder thread resources are occupied, and the binder thread frequently invokes a single API. Therefore, the terminal may stop responding to a request of creating a new binder thread for the target application, to avoid exhaustion of the binder thread resources that is caused by malicious occupation.

In a possible design method, after the stopping, by the terminal, creating a new binder thread for the target application, the method further includes: when the quantity M of binder threads providing the IPC service for the target application is less than the first threshold, creating, by the terminal, a new binder thread for the target application.

In a possible design method, the method further includes: displaying, by the terminal, a reason why the target system service thread times out, or displaying a prompt message of ending the first application process.

In a possible design method, an embodiment of this application provides a system service timeout processing method. Specifically, a system service process and at least one application process run on a terminal to which the method is applied, and the system service process includes at least one system service thread. Specifically, the method includes: When a first system service thread occupies a target locked object, a first timer is triggered to start timing.

When the first timer expires, if the first system service thread still has not released the target locked object, a terminal is triggered to obtain an identifier of the first system service thread occupying the target locked object. Further, the terminal determines, based on the identifier of the first system service thread, a target application process communicating with the first system service thread, and ends the target application process.

In another possible design method, an embodiment of this application provides a system service timeout processing method. Specifically, a system service process and at least one application process run on a terminal to which the method is applied, and the system service process includes at least one system service thread. Specifically, the method includes: A first system service thread communicates with a first application process. When a second application process requires a system service provided by the first system service thread, a second timer is triggered to start timing. When the second timer expires, if the first system service thread is still communicating with the first application process, the terminal is triggered to end the first application process.

According to a second aspect, an embodiment of this application provides a terminal. A system service process and at least one application process run on the terminal, and the system service process includes at least one system service thread. The terminal includes: a timeout detection unit, configured to detect whether a target system service thread in the at least one system service thread times out; a determining unit, configured to: when the target system service thread times out, determine a first application process communicating with the target system service thread, where the timeout of the target system service thread includes at least one of the following: a locked object occupied by the target system service thread is not released within a preset time, and the target system service thread is blocked; and a timeout processing unit, configured to end the first application process.

In a possible design method, the determining unit is specifically configured to query, from stored registration information, the first application process communicating with the target system service thread, where a correspondence between a system service thread and the first application process that perform inter-process communication IPC is recorded in the registration information.

In a possible design method, the timeout processing unit is further configured to restart the first application process.

In a possible design method, the timeout detection unit is further configured to monitor a total quantity N of binder binder threads that are currently running, where N is an integer greater than or equal to 0; the determining unit is further configured to: when the total quantity of binder threads is greater than a first preset value, determine an application process served by each of the N binder threads; and count a quantity of binder threads occupied by each of all target application processes; and the timeout processing unit is further configured to: when a quantity of binder threads occupied by a first target application process is greater than a second preset value, end the first target application process.

In a possible design method, when a quantity of binder threads occupied by a second target application process is greater than the second preset value, a priority of the second target application process is higher than a priority of the first target application process, and the timeout processing unit is further configured to: end the second target application process; and restart the second target application process.

In a possible design method, the timeout processing unit is specifically configured to: record a running progress of the second target application process; and restore, based on the running progress, the second target application process to a running status the same as the running progress.

In a possible design method, the determining unit is further configured to: count a quantity M of binder threads providing an IPC service for a target application, where M is an integer greater than or equal to 0; and the timeout processing unit is further configured to stop, when the quantity M of binder threads is greater than or equal to a first threshold, creating a new binder thread for the target application.

In a possible design method, the timeout processing unit is specifically configured to: collect statistics about an application programming interface API invoked by each of the M binder threads; and when a quantity of times for which one API is invoked is greater than a second threshold, stop responding to a request of creating a new binder thread for the target application.

In a possible design method, the timeout processing unit is further configured to: when the quantity M of binder threads providing the IPC service for the target application is less than the first threshold, create a new binder thread for the target application.

In a possible design method, the terminal further includes a display unit, configured to: display a reason why the target system service thread times out, or display a prompt message of ending the first application process.

According to a third aspect, an embodiment of this application provides a terminal. The terminal includes: a processor, a memory, a bus, and a communications interface. The memory is configured to store a computer-executable instruction, the processor is connected to the memory by using the bus, and when the terminal runs, the processor executes the computer-executable instruction stored in the memory, and the terminal is enabled to perform any one of the foregoing system service timeout processing methods.

According to a fourth aspect, an embodiment of this application provides a computer-readable storage medium. The computer-readable storage medium stores an instruction, and when the instruction is run on any one of the foregoing terminals, the terminal is enabled to perform any one of the foregoing system service timeout processing methods.

According to a fifth aspect, an embodiment of this application provides a computer program product including an instruction. When the computer program product is run on any one of the foregoing terminals, the terminal is enabled to perform any one of the foregoing system service timeout processing methods.

For technical effects brought by any design in the second aspect to the fifth aspect, refer to technical effects brought by different design methods in the first aspect. Details are not described herein again.

DETAILED DESCRIPTION OF ILLUSTRATIVE EMBODIMENTS

Figure 1:
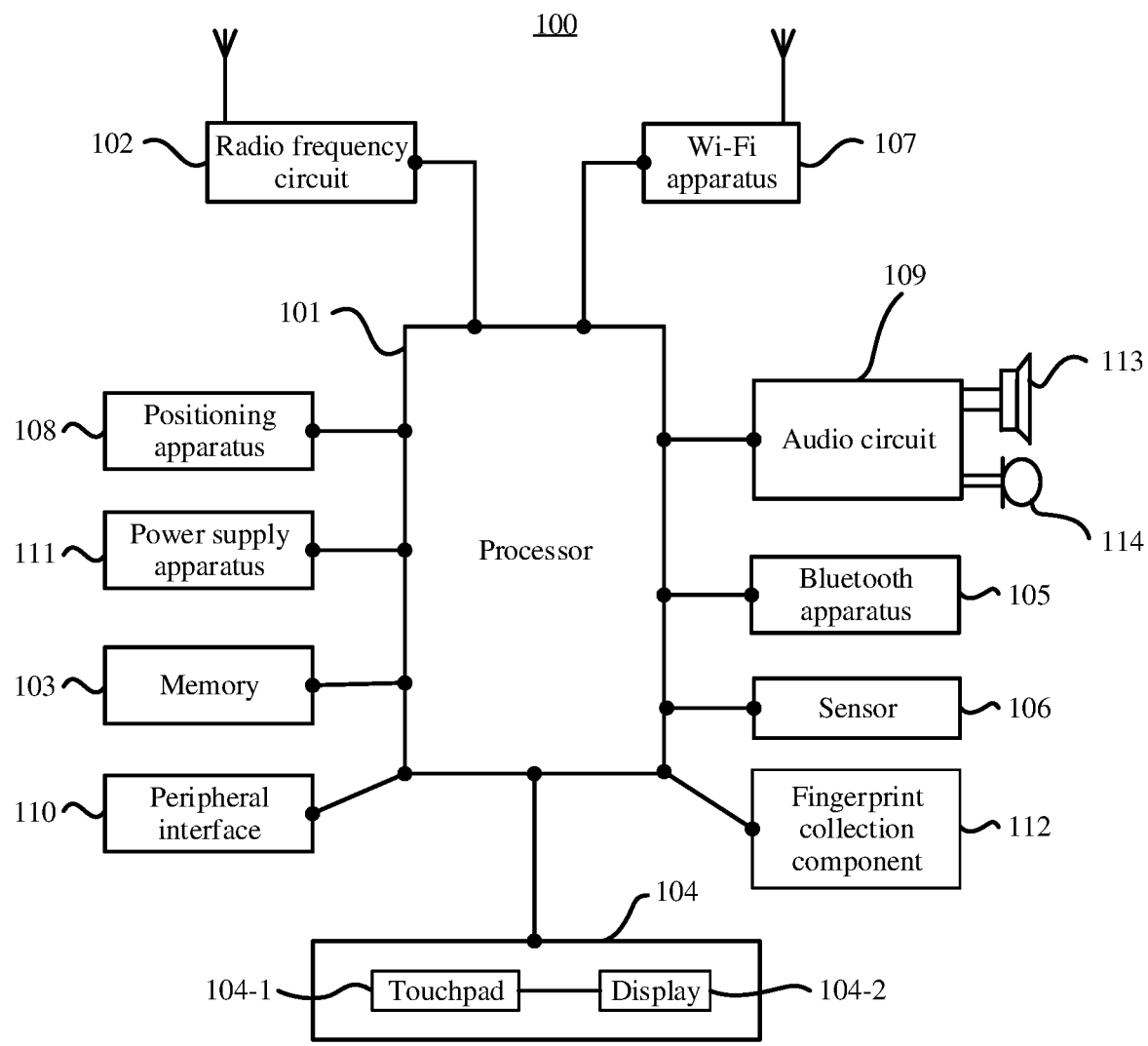
FIG. 1 is a first schematic structural diagram of a terminal according to an embodiment of this application.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiments of this application, unless otherwise stated, "multiple" means two or more than two.

To clearly describe a system service timeout processing method provided in the embodiments of this application, some concepts that may appear in subsequent embodiments are described first.

A process (process) is a running activity of an application program on a data set, and is a basic unit for an operating system (for example, an Android system) to allocate and schedule resources. Each process occupies an address space. Application programs are run on an operating system as one or more processes to implement corresponding functions.

A thread (thread) is an entity of a process, and is a basic unit that is smaller than a process and that can run independently. A thread can share all resources of a process with other threads that belong to the same process. One thread can create and cancel another thread. A plurality of threads in one process can be executed concurrently.

Object locking is a mechanism ensuring that only one thread accesses a method or variable at a time. In a Java language, when a thread accesses synchronized code, a locked object to which the code belongs needs to be obtained. Otherwise, the thread is to wait (or be blocked) until the locked object is released. The synchronized code is a method or a statement block modified by the keyword "synchronized".

In other words, object locking is a mutual exclusion, which means that a maximum of one thread can obtain the lock. When a thread A attempts to obtain a locked object held by a thread B, the thread A needs to wait or be blocked. The thread A can obtain the locked object to access a corresponding method or variable only until the thread B releases the lock.

Thread blocking usually refers to timeout caused when suspension duration of a thread in an execution procedure is greater than a preset value. For example, in an execution procedure of the thread A, an execution result of the thread B needs to be used as an input parameter to continue execution. In this case, if the thread A does not obtain the execution result of the thread B, the execution is suspended. When the thread A has not obtained the execution result of the thread B within a preset time, the A thread is blocked. Alternatively, thread blocking may refer to a phenomenon that the thread cannot provide a service for another process because the thread is occupied by a process for a long time when the thread communicates with the process.

Currently, a terminal may monitor some threads and locked objects in an operating system based on a watchdog mechanism. When a monitored thread is blocked or when a monitored locked object is not released for a long time, the terminal may be triggered to restart the entire operating system, to avoid suspension or screen freezing.

However, although eliminating freezing by restarting the entire operating system can resolve a problem that a thread is blocked or a locked object is not released normally, another normally running thread and locked object in the operating system are also forcibly ended. Undoubtedly a large amount of data of a running application program is lost. In addition, user experience is compromised.

Therefore, in the embodiments of this application, based on an existing watchdog triggering mechanism, when detecting that a monitored thread is blocked or a monitored locked object is not released for a long time, the terminal may first determine an application process communicating with a thread (or a process) that is blocked or that occupies the locked object. Further, the terminal may resolve, by using a restoration policy, such as ending or restarting the application process, the problem that a current thread is blocked or a locked object cannot be released. In this way, a running procedure of a thread that is not blocked or that normally releases a locked object in the operating system is not affected, and a freezing problem caused by thread blocking or a locked object release failure can also be resolved, thereby greatly improving user experience.

The foregoing application process may be a process of an application program at an application layer of the terminal, or may be a daemon (daemon) process running in the background. This is not limited in the embodiments of this application.

A system service timeout processing method provided in an embodiment of this application may be applied to any terminal such as a mobile phone, a wearable device, an augmented reality (augmented reality, AR)/virtual reality (virtual reality, VR) device, a tablet computer, a notebook computer, an ultra-mobile personal computer (ultra-mobile personal computer, UMPC), a netbook, or a personal digital assistant (personal digital assistant, PDA). Certainly, a specific form of the terminal is not limited in the following embodiments.

As shown in FIG. 1, the terminal in the embodiments of this application may be a mobile phone 100. The following describes the embodiments in detail by using the mobile phone 100 as an example. It should be understood that the mobile phone 100 shown in the figure is merely an example of the terminal, the mobile phone 100 may have more or fewer components than those shown in the figure, two or more components may be combined, or a different component configuration may be used.

As shown in FIG. 1, the mobile phone 100 may specifically include components such as a processor 101, a radio frequency (radio frequency, RF) circuit 102, a memory 103, a touchscreen 104, a Bluetooth apparatus 105, one or more sensors 106, a wireless fidelity (wireless fidelity, Wi-Fi) apparatus 107, a positioning apparatus 108, an audio circuit 109, a peripheral interface 110, and a power system 111. These components may communicate with each other by using one or more communications buses or signal cables (not shown in FIG. 1). A person skilled in the art may understand that the hardware structure shown in FIG. 1 does not constitute a limitation on the mobile phone, and the mobile phone 100 may include more or fewer components than those shown in the figure, some components may be combined, or a different component arrangement may be used.

The following describes the components of the mobile phone 100 in detail with reference to FIG. 1.

The processor 101 is a control center of the mobile phone 100. The processor 101 is connected to various parts of the mobile phone 100 by using various ports and lines, runs or executes an application program stored in the memory 103, and invokes data stored in the memory 103, to perform various functions of the mobile phone 100 and process data. In some embodiments, the processor 101 may include one or more processing units. For example, the processor 101 may be a Kirin 96o chip manufactured by Huawei Technologies Co., Ltd. In some embodiments of this application, the processor 101 may further include a fingerprint verification chip, configured to verify a collected fingerprint.

The radio frequency circuit 102 may be configured to send and receive a radio signal in an information sending and receiving procedure or in a call procedure. Particularly, after receiving downlink data from a base station, the radio frequency circuit 102 may send the downlink data to the processor 101 for processing. In addition, the radio frequency circuit 102 sends related uplink data to the base station. Generally, the radio frequency circuit includes, but is not limited to, an antenna, at least one amplifier, a transceiver, a coupler, a low noise amplifier, a duplexer, and the like. In addition, the radio frequency circuit 102 may further communicate with another device through wireless communication. Any communications standard or protocol may be used in the wireless communication, including but not limited to a global system for mobile communications, a general packet radio service, code division multiple access, wideband code division multiple access, long term evolution, email, a short message service, and the like.

The memory 103 is configured to store an application program and data. The processor 101 runs the application program and the data that are stored in the memory 103, to execute various functions of the mobile phone 100 and process data. The memory 103 mainly includes a program storage area and a data storage area. The program storage area may store an operating system and an application program that is required by at least one function (for example, a sound or image playing function). The data storage area may store data (for example, audio data or a phone book) created based on use of the mobile phone 100. In addition, the memory 103 may include a high-speed random access memory (random access memory, RAM), and may further include a non-volatile memory such as a magnetic disk storage device, a flash memory device, or another volatile solid-state memory. The memory 103 may store various operating systems such as an iOS® operating system developed by Apple and an Android® operating system developed by Google. The memory 103 may be independent, and is connected to the processor 101 by using the communications bus. Alternatively, the memory 103 may be integrated into the processor 101.

The touchscreen 104 may specifically include a touchpad 104-1 and a display 104-2.

The touchpad 104-1 can collect a touch event performed by a user of the mobile phone 100 on or near the mobile phone 100 (for example, an operation performed by the user on or near the touchpad 104-1 by using any suitable object such as a finger or a stylus), and send collected touch information to another component (such as the processor 101). The touch event performed by the user near the touchpad 104-1 may be referred to as a floating touch. The floating touch may mean that the user does not need to directly touch the touchpad to select, move, or drag an object (for example, an icon), and the user only needs to be near the terminal to perform a desired function. In addition, the touchpad 104-1 may be implemented in a plurality of types such as a resistive type, a capacitive type, an infrared type, or a surface acoustic wave type.

The display (also referred to as a display screen) 104-2 may be configured to display information input by the user or information provided for the user, and various menus of the mobile phone 100. The display 104-2 can be configured in a form of a liquid crystal display, an organic light emitting diode, or the like. The touchpad 104-1 may cover the display 104-2. When detecting a touch event on or near the touchpad 104-1, the touchpad 104-1 transfers the touch event to the processor 101 to determine a type of the touch event. Then, the processor 101 can provide a corresponding visual output on the display 104-2 based on the type of the touch event. Although the touchpad 104-1 and the display screen 104-2 in FIG. 1 are used as two independent components to implement input and output functions of the mobile phone 100, in some embodiments, the touchpad 104-1 and the display screen 104-2 may be integrated to implement the input and output functions of the mobile phone 100. It may be understood that the touchscreen 104 is formed by stacking layers of materials. In this embodiment of this application, only the touchpad (layer) and the display screen (layer) are displayed, and another layer is not recorded in this embodiment of this application. In addition, the touchpad 104-1 may be configured on a front side of the mobile phone 100 in a form of a bezel-less screen, and the display screen 104-2 may also be configured on the front side of the mobile phone 100 in a form of a bezel-less screen. In this way, a bezel-less structure can be implemented on the front side of the mobile phone.

In addition, the mobile phone 100 may further have a fingerprint recognition function. For example, a fingerprint recognizer 112 may be configured on a rear side of the mobile phone 100 (for example, below a rear-facing camera), or a fingerprint recognizer 112 may be configured on the front side of the mobile phone 100 (for example, below the touchscreen 104). For another example, a fingerprint collection component 112 may be disposed in the touchscreen 104, to implement a fingerprint recognition function, that is, the fingerprint collection component 112 may be integrated into the touchscreen 104 to implement the fingerprint recognition function of the mobile phone 100. In this case, the fingerprint collection component 112 is configured in the touchscreen 104, and may be a part of the touchscreen 104, or may be configured in the touchscreen 104 in another manner. A main component of the fingerprint collection component 112 in this embodiment of this application is a fingerprint sensor. The fingerprint sensor may use any type of sensing technology, which includes but is not limited to an optical sensing technology, a capacitive sensing technology, a piezoelectric sensing technology, an ultrasonic sensing technology, or the like.

The mobile phone 100 may further include the Bluetooth apparatus 105, configured to exchange data between the mobile phone 100 and another short-range terminal (for example, a mobile phone or a smartwatch). In this embodiment of this application, the Bluetooth apparatus may be an integrated circuit, a Bluetooth chip, or the like.

The mobile phone 100 may further include at least one sensor 106 such as an optical sensor, a motion sensor, and another sensor. Specifically, the optical sensor may include an ambient light sensor and a proximity sensor. The ambient light sensor may adjust luminance of the display of the touchscreen 104 based on ambient light luminance. The proximity sensor may power off the display when the mobile phone 100 approaches to ears. As a type of motion sensor, an accelerometer sensor may detect values of acceleration in all directions (usually, three axes), may detect a value and a direction of gravity when the sensor is stationary, and may be used in an application program for identifying a mobile phone posture (such as screen switching between a landscape mode and a portrait mode, a related game, or magnetometer posture calibration), a function related to vibration identification (such as a pedometer or a knock), and the like. Other sensors such as a gyroscope, a barometer, a hygrometer, a thermometer, and an infrared sensor may be further disposed on the mobile phone 100. Details are not described herein.

The Wi-Fi apparatus 107 is configured to provide, for the mobile phone 100, network access that complies with a Wi-Fi-related standard protocol. The mobile phone 100 may access a Wi-Fi access point by using the Wi-Fi apparatus 107, to help the user send and receive an email, browse a web page, access streaming media, and so on. The Wi-Fi apparatus 107 provides wireless broadband Internet access for the user. In some other embodiments, the Wi-Fi apparatus 107 may be used as a Wi-Fi wireless access point, and may provide Wi-Fi network access for another terminal.

The positioning apparatus 108 is configured to provide a geographic location for the mobile phone 100. It may be understood that the positioning apparatus 108 may be specifically a receiver of a positioning system such as the global positioning system (global positioning system, GPS), the Beidou satellite navigation system, or the GLONASS of Russia. After receiving a geographic location sent by the positioning system, the positioning apparatus 108 sends the information to the processor 101 for processing, or sends the information to the memory 103 for storage. In some other embodiments, the positioning apparatus 108 may further be a receiver of an assisted global positioning system (assisted global positioning system, AGPS). The AGPS system serves as an assisted server to assist the positioning apparatus 108 in completing ranging and positioning services. In this case, the assisted positioning server communicates with the positioning apparatus 108 (that is, a GPS receiver) of the terminal, for example, the mobile phone 100, through a wireless communications network, and provides positioning assistance. In some other embodiments, the positioning apparatus 108 may be a positioning technology based on a Wi-Fi access point. Each Wi-Fi access point has a globally unique media access control (media access control, MAC) address, and the terminal can scan and collect a broadcast signal of a surrounding Wi-Fi access point when Wi-Fi is enabled. Therefore, the terminal can obtain a MAC address that is broadcast by the Wi-Fi access point. The terminal sends such data (for example, the MAC address) that can identify the Wi-Fi access point to a location server through the wireless communications network. The location server retrieves a geographic location of each Wi-Fi access point, calculates a geographic location of the terminal with reference to strength of the Wi-Fi broadcast signal, and sends the geographic location of the terminal to the positioning apparatus 108 of the terminal.

The audio circuit 109, a speaker 113, and a microphone 114 may provide audio interfaces between the user and the mobile phone 100. The audio frequency circuit 109 may transmit, to the speaker 113, an electrical signal converted from received audio data, and the speaker 113 converts the electrical signal into a sound signal for outputting. In addition, the microphone 114 converts a collected sound signal into an electrical signal, and the audio frequency circuit 109 converts the electrical signal into audio data after receiving the electrical signal, and then outputs the audio data to the RF circuit 102 to send the audio data to, for example, another mobile phone, or outputs the audio data to the memory 103 for further processing.

The peripheral interface no is configured to provide various interfaces for external input/output devices (such as a keyboard, a mouse, an external display, an external memory, and a subscriber identity module card). For example, the mobile phone 100 is connected to the mouse by using a universal serial bus (universal serial bus, USB) interface, and is connected, by using a metal contact on a card slot of the user identity module card, to the user identity module card (subscriber identification module, SIM) card provided by a telecommunications operator. The peripheral interface no may be configured to couple the external input/output peripheral device with the processor 101 and the memory 103.

The mobile phone 100 may further include a power supply apparatus iii (for example, a battery or a power management chip) that supplies power to various components. The battery may be logically connected to the processor 101 by using the power management chip, so that functions such as charging management, discharging management, and power consumption management are implemented by using the power supply apparatus 111.

Although not shown in FIG. 1, the mobile phone 100 may further include a camera (a front-facing camera and/or a rear-facing camera), a flashlight, a micro projection apparatus, a near field communication (near field communication, NFC) apparatus, and the like, and details are not described herein.

Further, the mobile phone 100 may run an operating system such as Android or iOS. This is not limited in this embodiment of this application.

Figure 2:
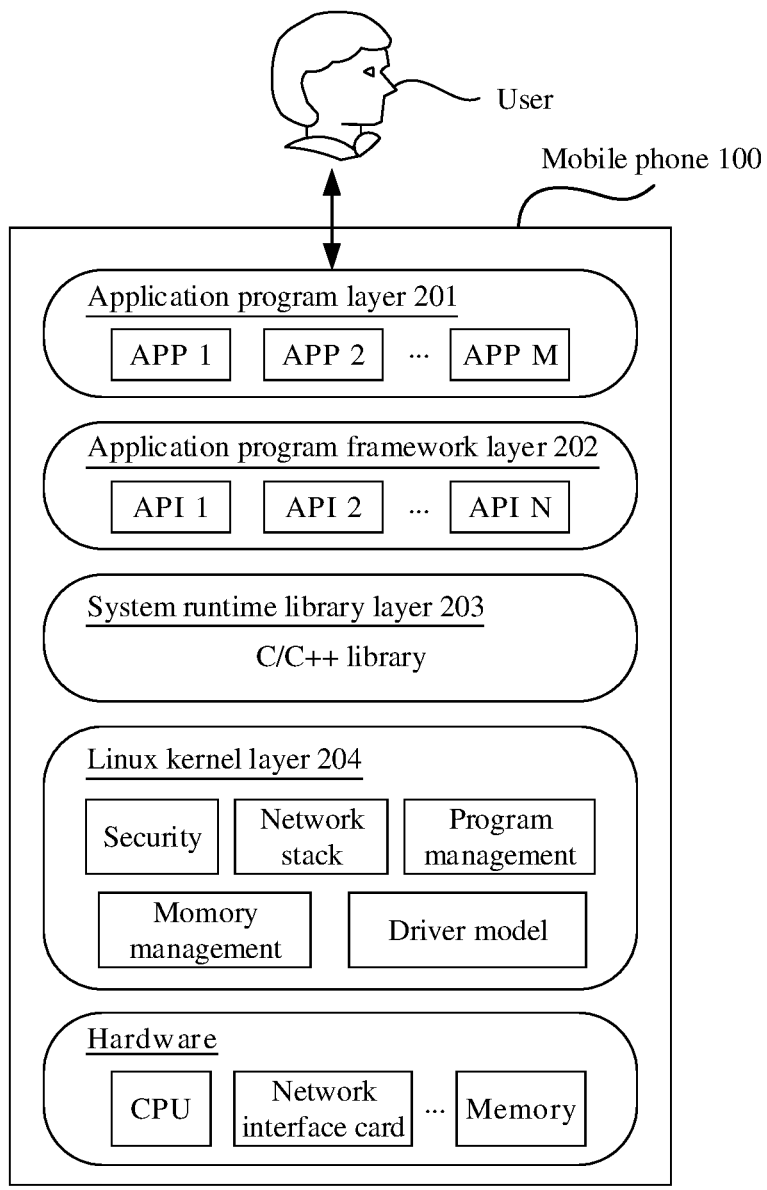
FIG. 2 is a first schematic architectural diagram of an Android system according to an embodiment of this application.

Using the Android operating system as an example, as shown in FIG. 2, the Android operating system may be divided into four layers: an application program layer 201 (that is, an app layer), an application program framework layer 202 (that is, a framework layer), a system runtime library layer 203 (that is, an libraries layer), and a Linux kernel layer 204 in descending order.

The Linux kernel layer 204 may be used for functions such as security (security) control of the mobile phone 100, memory management (memory management), program management (process management), a network stack (network stack), and a driver model (driver model). The Linux kernel layer 204 also serves as an abstraction layer between hardware (for example, a CPU, a network interface card, and a memory) and a software stack, and may hide specific hardware details, to provide a unified service for upper layers (the system runtime library layer 203, the application program framework layer 202, and the application program layer 201).

The system runtime library layer 203 includes some C/C++ libraries, such as a media library, a system C library, and a display management library (a surface manager). These libraries can be used by different components in the Android system. The system runtime library layer 203 may provide a service for a developer by using the framework layer 202.

The framework layer 202 provides developers with an application programming interface (application programming interface, API) framework that allows full access to an application program. Specifically, the framework layer 202 provides many APIs for developing an application program, and an app that meets a related service requirement may be constructed by invoking a corresponding API.

The application program layer 201 mainly includes an app compiled by using a Java language. When operating an operation screen on the app, a user interacts with the system runtime library layer 203 or the Linux kernel layer 204 by invoking a related API in the framework layer 202, to implement a function corresponding to the operation screen.

Figure 3:
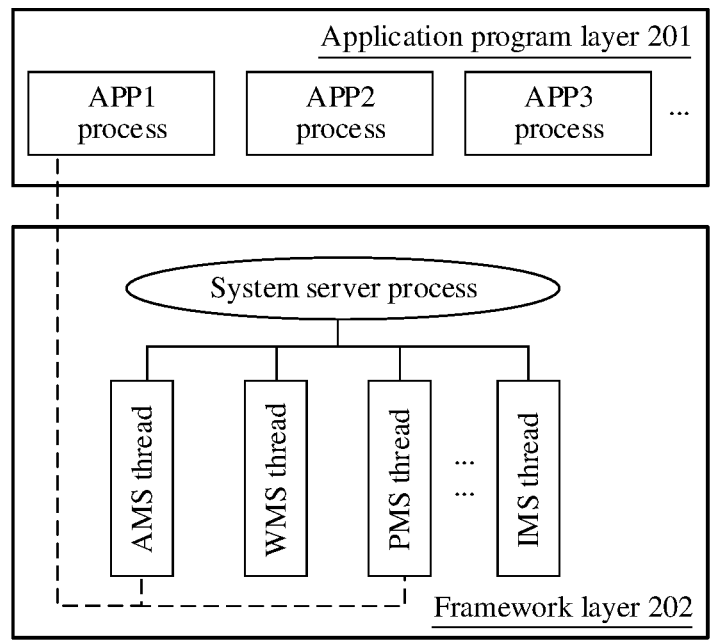
FIG. 3 is a second schematic architectural diagram of an Android system according to an embodiment of this application.

As shown in FIG. 3, a system service (system server) process runs at the framework layer 202. The system server process may provide almost all system services for the mobile phone 100, for example, a power manager service (power manager service, PMS), an activity manager service (activity manager service, AMS), a window manager service (window manager service, WMS), a Bluetooth service (bluetooth service), a network management service (network management service, NMS), and an input manager service (input manager service, IMS).

Still as shown in FIG. 3, these system services may reside in a system server process as threads (subsequently referred to as system service threads), and these system service threads may implement inter-process communication (inter-process communication, IPC) with a process of a third-party application or a daemon (daemon) process at the application program layer 201. For example, a process of the WeChat application may communicate with an input manager service thread in a running procedure, to invoke an API of the input manager service to provide an input method service in the WeChat application.

For example, the system service thread (for example, the input manager service thread) may specifically communicate with a process of another application by using a binder service or a socket (socket) service.

Figure 4:
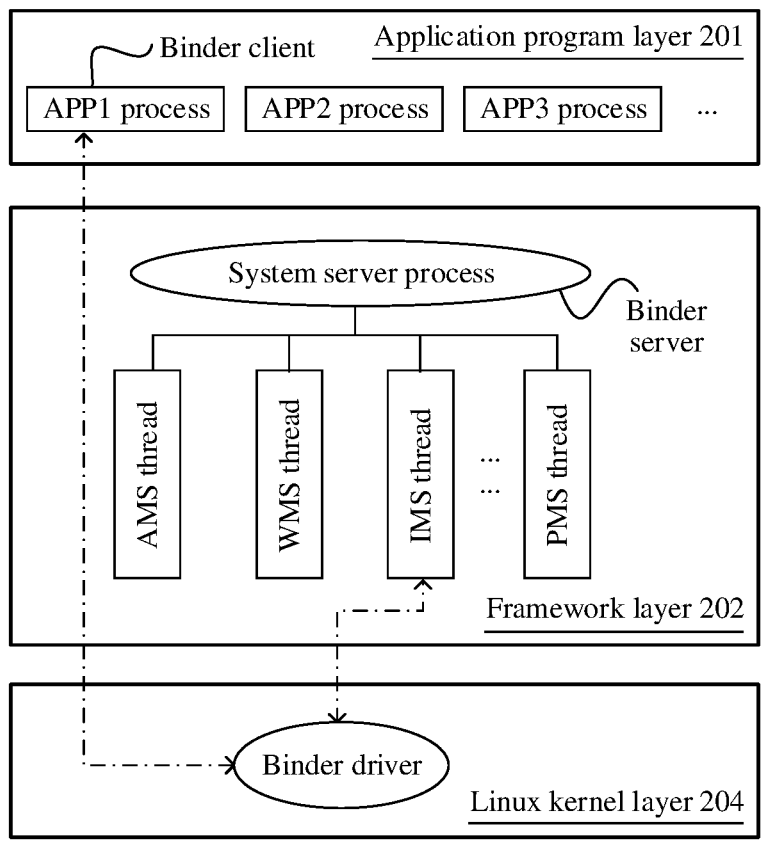
FIG. 4 is a third schematic architectural diagram of an Android system according to an embodiment of this application.

Using the binder service as an example, as shown in FIG. 4, three modules are provided in a binder service architecture: a server, a binder driver, and a client. An application process running at the app layer 201 may be used as a client, and each system service provided by the framework layer 202 may be used as a server. The binder driver may be located at the Linux kernel layer 204, and identifiers of each pair of processes (or threads) that communicate by using the binder service are recorded in the binder driver.

When a client (for example, a WeChat process) intends to access a server (for example, the input manager service thread) to invoke a related system service, the client may invoke the binder driver by using a transact( ) function, and the binder driver sends an invocation message to a system service thread of the server. After receiving the invocation message sent by the binder driver, the system service thread of the server starts a binder thread, and executes service code of the server based on parameters of an onTransact( ) function, to implement a corresponding system service.

When the system service thread communicates with another process, the system service thread may be blocked or a locked object occupied by the system service thread cannot be released for a long time. For example, when a process of the WeChat application enters an infinite loop in an execution procedure, a system service thread A communicating with the process of the WeChat application is blocked. If an existing watchdog mechanism is used, the mobile phone 100 is triggered to restart. Consequently, all current running data of the mobile phone 100 is lost.

In some embodiments of this application, when a locked object is occupied, a terminal may be triggered to enable a first timer to start timing. When the first timer expires, if the locked object is still occupied, the locked object times out. In this case, the terminal may be triggered to obtain an identifier of a system service thread (for example, a first system service thread) occupying the locked object. Further, the terminal may determine, based on the identifier of the first system service thread and by using the binder driver, a target application process communicating with the first system service thread, and end the target application process. After the target application process is ended, the first system service thread communicating with the target application process is released. Therefore, the locked object occupied by the first system service thread is also released, so that another system service thread having a requirement may continue to use the locked object.

Alternatively, in some other embodiments of this application, a plurality of application processes may run on a terminal, and these application processes may communicate with one or more system service threads to implement a related system service. When a first application process communicates with a system service thread (for example, a first system service thread), the first system service thread cannot provide a service for another application process (for example, a second application process). Therefore, after the first application process occupies the first system service thread, the terminal may be triggered to enable a second timer to start timing. When the second timer expires, if the first system service thread is still occupied, in other words, the first system service thread is blocked, the terminal may be triggered to determine a specific process currently communicating with the first system service thread, that is, the first application process, and end the first application process. After the first application process is ended, the first system service thread communicating with the first application process is released, another application process having a requirement subsequently may communicate with the released first system service thread to implement a related system service.

In addition, as can be learned from the foregoing embodiment, after the terminal ends the application process communicating with the first system service thread, another system service thread or application process running the terminal is not affected, thereby reducing a probability of frame freezing or screen freezing of the terminal, and improving user experience.

In another embodiment, a system service process and at least one application process run on a terminal, and the system service process includes at least one system service thread. When a target system service thread in the at least one system service thread times out, the terminal determines a first application process communicating with the target system service thread, where the timeout of the target system service thread includes at least one of the following: a locked object occupied by the target system service thread is not released within a preset time, and the target system service thread is blocked; and the terminal ends the first application process.

Figure 5:
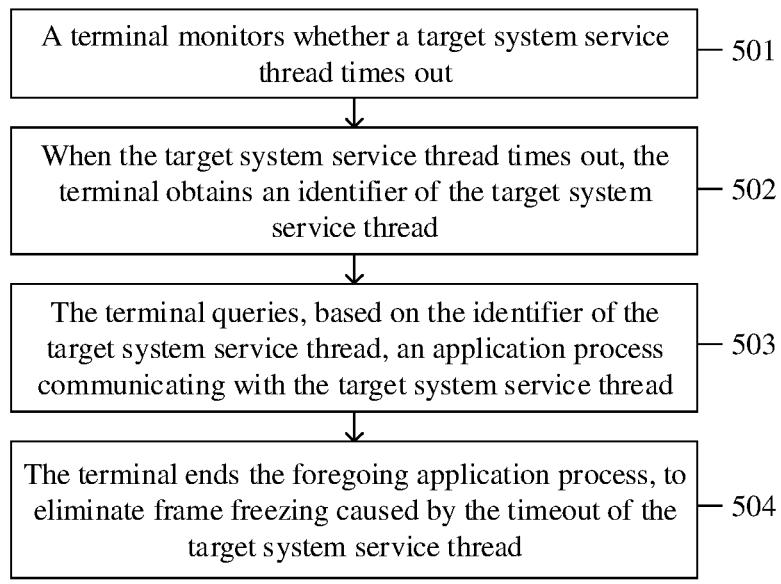
FIG. 5 a first schematic flowchart of a system service timeout processing method according to an embodiment of this application.

An embodiment of this application provides a system service timeout processing method. For ease of description, in this embodiment of this application, timeout of a system service thread may mean that a locked object occupied by a system service thread in a system server process is not released within a preset time, or may mean that blocking duration of a system service thread in a system server process reaches preset duration. As shown in FIG. 5, the method specifically includes the following steps.

501. A terminal monitors whether a target system service thread times out.

The target system service thread may be any system service thread that runs in the system server process, for example, a system service thread occupying a target locked object (for example, any locked object such as inputmanagerservice.this or activitymanagerservice.this), or may be a system service thread that is communicating with another thread (or process). This is not limited in this embodiment of this application.

Specifically, the terminal may still use an existing watchdog monitoring mechanism, and a processor of the terminal monitors locked objects occupied by some system service threads and the system service thread.

For example, the processor may monitor, by using a watchdog thread, whether the target locked object is released within a preset time (for example, 60 seconds). If the target locked object is not released within 60 seconds, it indicates that a system service thread (that is, the target system service thread) occupying the target locked object times out, in other words, a target system service times out.

In a possible implementation, the processor may monitor whether the target system service thread is being occupied by an application process; and if monitoring that the target system service thread is being occupied by an application process and occupation duration is greater than or equal to a preset threshold, may determine that the target system service thread times out.

For another example, the processor may further monitor, by using the watchdog thread, whether there is a blocking event reported by a system service thread. When a blocking event reported by a system service thread is received, it indicates that the system service thread (in this case, the system service thread is the target system service thread) is blocked, in other words, the target system service times out.

In some embodiments of this application, watchdog threads in the terminal may sequentially poll system service threads occupying locked objects. For example, there are currently five locked objects respectively occupied by different system service threads. The watchdog thread sequentially sends an electrical signal to the five system service threads (that is, to feed dog, feed dog). The system service thread receiving the electrical signal needs to return a response to the watchdog thread within a preset time (that is, to kick dog, kick dog). After receiving the response, the watchdog thread sequentially feeds dog for a next system service thread. If a system service thread (for example, a system service thread A) does not return a response to the watchdog thread within the preset time, it may be determined that a locked object occupied by the system service thread A times out. In this case, the system service thread A is the target system service thread, and the locked object occupied by the system service thread A is the target locked object.

In some embodiments of this application, the watchdog thread in the terminal may sequentially poll various system service threads that do not occupy any locked object, to detect whether the system service threads are blocked. For example, the watchdog thread may sequentially send an electrical signal to four currently running system service threads that do not occupy any locked object (that is, to feed dog). The system service thread receiving the electrical signal needs to return a response to the watchdog thread within the preset time (that is, to kick dog). If a system service thread (for example, a system service thread B) does not return a response to the watchdog thread within the preset time, it may be determined the system service thread B is blocked.

502. When the target system service thread times out, the terminal obtains an identifier of the target system service thread.

When the timeout of the target system service thread is caused due to blocking of the target system service thread, the target system service thread reports a blocking event to the watchdog thread. The blocking event may carry an identifier of the blocking event, for example, an ID number of the target system service thread, so that the terminal obtains the identifier of the target system service thread. Alternatively, the terminal may obtain the ID number of the target system service thread by invoking a getThreadId( ) function.

When the timeout of the target system service thread is caused due to timeout of the target locked object, it indicates that the target system service thread occupying the target locked object keeps occupying a system resource (for example, a memory resource) and does not release the system resource. Therefore, another thread cannot obtain the target locked object subsequently, to implement a related service. In this case, frame freezing or even screen freezing of the terminal probably occurs.

Therefore, when the target locked object times out, the terminal may search, by invoking a Java native interface (Java Native Interface, JNI) interface, for the identifier of the specific target system service thread occupying the target locked object. For example, the processor of the terminal may invoke a GetLockOwnerThreadId( ) function in the JNI interface. A return value of the function is the ID number of the target system service thread (that is, the identifier of the target system service thread) occupying the target locked object. For example, if the return value of the GetLockOwnerThreadId( ) function is 01, and 01 is an ID number of a window manager service (window manager service) thread, the target system service thread is the window manager service thread.

Certainly, it may be understood that the identifier of the target system service thread may alternatively be a parameter such as a name of the target system service thread that can uniquely identify the thread in the terminal. This is not limited in this embodiment of this application.

503. The terminal queries, based on the identifier of the target system service thread, an application process communicating with the target system service thread.

A reason why the target system service thread times out may be that the application process communicating with the target system service thread is blocked or enters an infinite loop and the like. Therefore, in step 503, after determining the timeout target system service thread, the processor of the terminal may further query, in the memory based on the identifier of the target system service thread, the specific application process communicating with the target system service thread.

An example in which the target system service thread communicates with the application process by using a binder service is used. Still as shown in FIG. 4, each system service thread in the system server process may register with a binder driver in advance, because registration information such as an ID number of each system service thread is recorded in the binder driver.

For example, when registering with the binder driver, the window manager service thread may report an ID number of the window manager service thread and a function of the window manager service thread, for example, a function of creating a window (window). When an app 1 process at an application program layer 201 needs to use the creation function subsequently, an inter-process communication request for communicating with the window manager service thread may be initiated to the binder driver. After receiving the inter-process communication request, the binder driver may request, based on the registration information, the window manager service thread to create a corresponding window, so as to complete an IPC communication procedure between the app 1 process and the window manager service thread.

In other words, the binder driver may be configured to maintain a correspondence between each system service thread and an application process that perform IPC communication.

For example, as shown in Table 1, each time after receiving an inter-process communication request of a third-party application process (or a daemon process), the binder driver may record, in the foregoing registration information, a correspondence between the third-party application process (or the daemon process) and a system service thread that communicates with the third-party application process (or the daemon process). In step 503, after determining the identifier of the target system service thread, the terminal may find, from registration information shown in Table 1, that an application process communicating with the target system service thread (for example, the window manager service thread) is a WeChat application process. An identifier of the WeChat application process is 11.

TABLE 1

| Identifier of a system service thread | Identifier of a third-party application process (or a daemon process) |
| --- | --- |
| 01 (window manager service thread) | 11 (WeChat application process) |
| 02 (power manager service thread) | 10 (browser application process) |

In addition, if the target system service thread is not recorded in the registration information, it indicates that the target system service thread may not perform IPC communication, or the target system service thread may communicate with the third-party application process (or the daemon process) in another manner (for example, by using a socket service).

For example, the target system service thread may communicate with an application process by using the socket service. In this embodiment of this application, when a system service thread communicates with an application process based on the socket service, the terminal may actively record an identifier of the application process. In this way, when a target system service times out, for example, when establishment of a socket connection between the target system service thread and an application process times out, the terminal may query a recorded identifier of an application process communicating with the target system service thread, to determine a specific application process causing the timeout of the target system service.

504. The terminal ends the foregoing application process, to eliminate frame freezing caused by the timeout of the target system service thread.

After the terminal determines the specific application process communicating with the target system service thread, the processor of the terminal may end (kill) the application process. After the application process is ended, the target system service thread communicating with the application process is released. In this way, the target locked object occupied by the target system service thread may be released, and the originally blocked target system service thread may continue to provide a corresponding system service, thereby reducing a probability of blocking or screen freezing caused by timeout of the system service.

Further, after the terminal ends the application process, the processor may further restart the application process, for example, restart the WeChat application, so that a user may continue an operation on the restarted app.

In this way, after the application process is ended or restarted, the target locked object occupied by the target system service thread communicating with the application process may be released, blocking of the target system service thread is eliminated, and a running procedure of another system service in the terminal is not affected.

Certainly, in addition to directly ending or restarting the application process, a person skilled in the art may alternatively set a restoration policy to restore the application process. For example, when a plurality of system service threads time out, based on priorities of application processes, the terminal may directly end an application process having a lower priority, and restart an application process having a higher priority.

In addition, when ending the application process, the terminal may further record a running progress of the current application process. In this way, after restarting the application process, the terminal may restore the application process to an original status based on the recorded running progress. For example, the WeChat application process is an application process, when ending the WeChat application process, the terminal may record chat information with a user A as a running progress. In this way, when restarting the WeChat application process, the terminal may restore the WeChat application process to a status before the restart based on the recorded running progress, so that sa service is not interrupted before and after the application process is restarted, thereby improving user experience.

Figure 6:
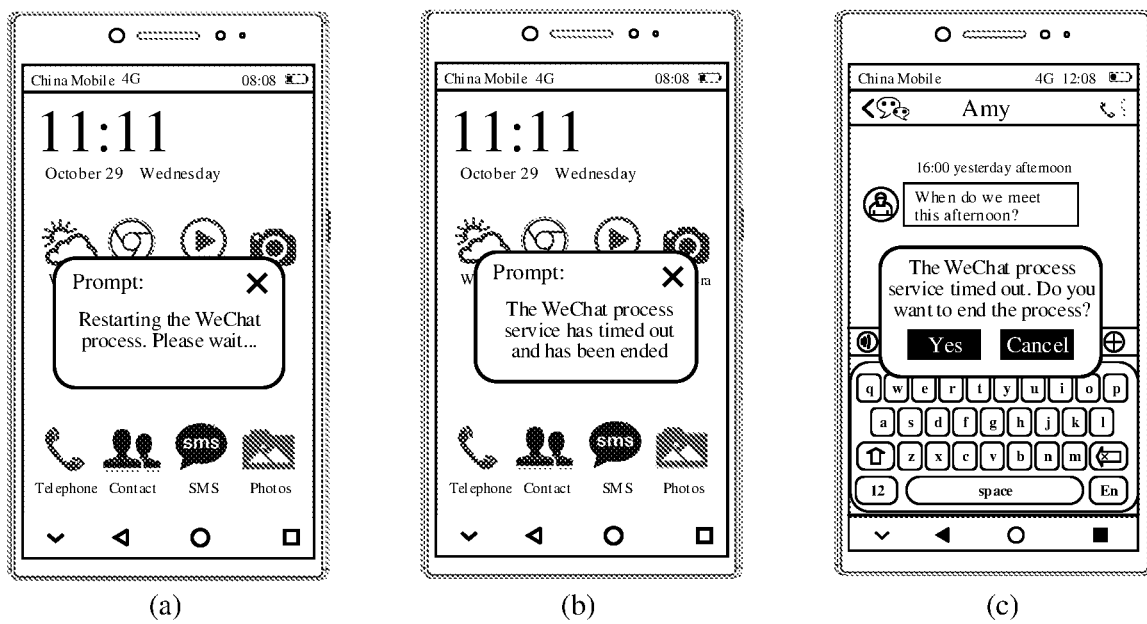
FIG. 6 is a first schematic diagram of an application scenario of a system service timeout processing method according to an embodiment of this application.

Further, when restoring the application process, the terminal may give a prompt message to the user by using a UI interface to ask the user to wait patiently, so as to prevent the user from falsely regarding that the terminal is currently freezing. For example, as shown in (a) in FIG. 6, when restarting the application process, the terminal may notify the user that the application process is being restarted. As shown in (b) in FIG. 6, after ending the application process, the terminal may notify the user that the application process has been ended due to timeout of the system service caused by the application process. Alternatively, as shown in (c) in FIG. 6, after determining the application process causing the timeout of the target system service, the terminal may further display a prompt message indicating whether to end the application process in a prompt message dialog box. If the user determines to end the application process, the terminal ends the application process.

Figure 7:
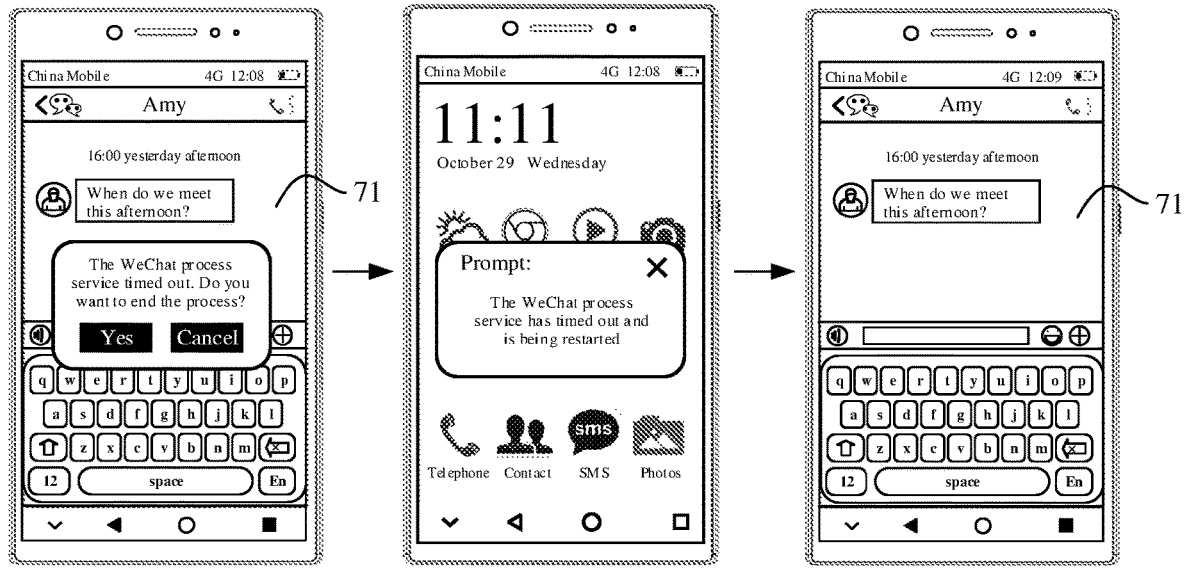
FIG. 7 is a second schematic diagram of an application scenario of a system service timeout processing method according to an embodiment of this application.

Alternatively, when ending the application process, the terminal may further save an application interface snapshot that is of an application process and that is presented on a UI interface. For example, when the application process is the WeChat process, as shown in FIG. 7, a snapshot of an application interface 71 that is of the WeChat application and that is currently displayed on the UI interface may be saved locally before the WeChat process is ended. When restarting the WeChat process, still as shown in FIG. 7, the terminal may first display the snapshot of the application interface 71 saved when the WeChat process is ended, and start the WeChat process in the background at the same time. For example, the terminal displays the application interface snapshot for two seconds, and restarts the WeChat process at the same time when displaying the application interface snapshot. In this way, a time of restarting the WeChat process can be shortened visually, thereby improving user experience.

Alternatively, each time a system service times out, the terminal may record a specific system service and application process that cause the timeout. When an application process frequently causes timeout, it indicates that a risk of frame freezing caused by running the application process is relatively high. Subsequently, when executing the application process, the terminal may prevent the timeout caused by the application process by allocating an extra system resource to the application process, clearing a current redundant process, and the like. Certainly, the terminal may further collect statistics about a specific running scenario causing timeout each time, for example, a payment scenario or a call scenario, so that the terminal predicts a subsequent scenario in which a risk of frame freezing is relatively high, and the terminal prevents in advance, in the scenario in which the risk of frame freezing is relatively high, timeout caused by the application process.

It may be understood that the terminal may report, to a server as historical data, a specific recorded system service and application process that cause timeout each time, and the server determines, for the terminal based on big data statistics, a prediction policy or an application process that needs to be prevented in advance and that easily causes timeout. This is not limited in this embodiment of this application.

The actions of the terminal in steps 501 to 504 may be performed by the processor 101 in FIG. 1 by running an instruction or software stored in the memory 103 to instruct the terminal to complete the system service timeout processing method.

Figure 8:
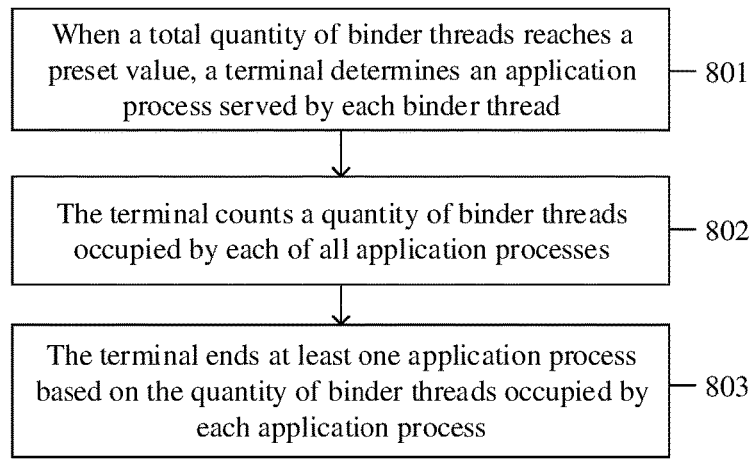
FIG. 8 a second schematic flowchart of a system service timeout processing method according to an embodiment of this application.

When any system service thread and an application process perform inter-process communication based on a binder service process, the terminal allocates a binder thread to implement the inter-process communication service. When a quantity of binder threads is excessively large, binder resources at a binder server are exhausted. As a result, another process requiring the inter-process communication cannot apply for a binder thread. Therefore, an embodiment of this application provides a system service timeout processing method. As shown in FIG. 8, the method includes the following steps.

801. When a total quantity of binder threads reaches a preset value, a terminal determines an application process served by each binder thread.

Specifically, a processor of the terminal may count the total quantity of binder threads that provide a binder service in the current terminal. Generally, a quantity of binder threads that can be supported by an operating system is fixed, for example, 16. Therefore, when the counted total quantity of binder threads is 16, that is, when the binder threads are full, the processor may be triggered to further determine an application process served by each of the 16 binder threads.

For example, each time after a binder driver receives an inter-process communication request sent by a third-party application process (or a daemon process), the binder driver allocates, from a binder resource pool, one or more binder threads to the third-party application process (or the daemon process) to implement the inter-process communication service. As shown in Table 2, in addition to a correspondence between each pair of a system service thread and a third-party application process (or a daemon process) that communicate with each other, the binder driver may further record, in registration information, an identifier of a binder thread providing the IPC service for each pair of a system service thread and a third-party application process. Therefore, in step 801, the terminal may query, in the registration information shown in Table 2, an application process served by each binder thread.

TABLE 2

| Identifier of a binder thread | Identifier of a system service thread | Identifier of a third-party application process (or a daemon process) |
| --- | --- | --- |
| a | 01 (window manager service thread) | 11 (WeChat application process) |
| b | 02 (power manager service thread) | 10 (browser application process) |
| c | 03 (Bluetooth service thread) | 11 (WeChat application process) |

802. The terminal counts a quantity of binder threads occupied by each of all application processes.

Because one application process may occupy a plurality of binder threads to perform inter-process communication, the processor may count, based on an application process served by each binder thread, a quantity of binder threads occupied by one application process. For example, in the foregoing 16 binder threads, a WeChat application process occupies eight binder threads, a music application process occupies five binder threads, and a browser application process occupies three binder threads.

803. The terminal ends at least one application process based on the quantity of binder threads occupied by each application process.

For example, the terminal may end or restart an application process that occupies a largest quantity of binder threads, for example, the WeChat application process, to release the eight binder threads occupied by the WeChat application process. The released binder threads may be used by another process (or another thread) waiting for inter-process communication.

Alternatively, the terminal may further end or restart an application process to release binder threads that are currently all occupied, where a quantity of binder threads occupied by the application process is greater than a preset value. Alternatively, based on priorities of application processes, the terminal may further release an application process having a lower priority, so that a binder thread occupied by the application process having a lower priority is released; and may reserve an application process having a higher priority, to avoid that a running status of the terminal and user experience are affected after the application process having a higher priority is ended (or restarted).

Certainly, a user may alternatively manually set a white list or a black list of application processes that are to be ended when binder threads are all occupied. In this way, when the binder threads are all occupied, the application processes in the whitelist may be reserved while the application processes in the blacklist may be ended or restarted.

It may be understood that a person skilled in the art may set an application process restoration policy based on actual experience or an actual application scenario when the binder threads are all occupied. This is not limited in this embodiment of this application.

In addition, the actions of the terminal in steps 801 to 803 may be performed by the processor 101 in FIG. 1 by running an instruction or software stored in the memory 103 to instruct the terminal to complete the system service timeout processing method.

Figure 9:
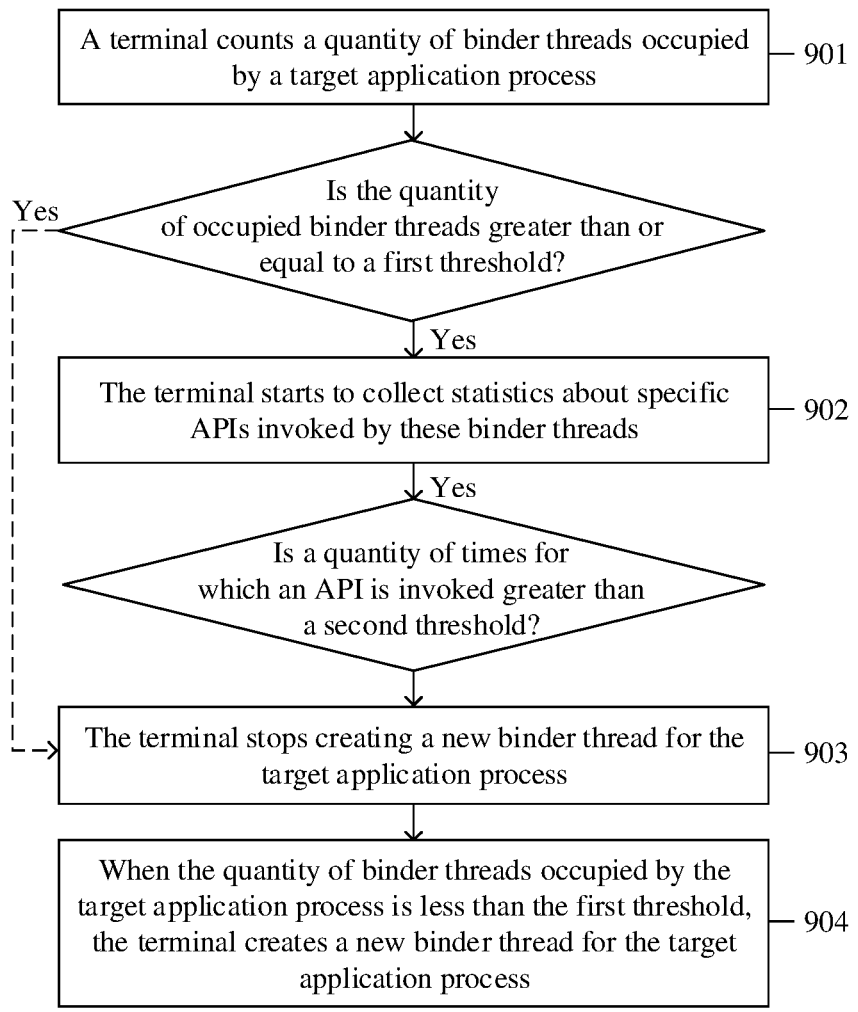
FIG. 9 a third schematic flowchart of a system service timeout processing method according to an embodiment of this application.

Further, to prevent frame freezing of the terminal caused when the binder threads are all occupied, an embodiment of this application further provides a system service timeout processing method. As shown in FIG. 9, the method includes the following steps.

901. A terminal counts a quantity of binder threads occupied by a target application process.

The target application process may be any application process installed at an app layer of the terminal. This is not limited in this embodiment of this application.

One process usually includes a plurality of threads, and therefore needs to communicate with another process (for example, a system service process) when the target application process is being executed. In this case, a binder driver creates a binder thread to implement inter-process communication in the target application process. Therefore, in step 701, the terminal may periodically count, by using a processor, the quantity of binder threads currently occupied by the target application process.

For example, the terminal may count, at an entry of a transact( ) function in an IPC thread state (IPC Thread State), binder threads created by the target application process, to obtain a quantity of binder threads occupied by the target application process.

902. When the quantity of binder threads occupied by the target application process is greater than or equal to a first threshold, the terminal starts to collect statistics about specific APIs invoked by these binder threads.

The API is one or more predefined functions, and provides a capability that an application program and a developer are capable of accessing a group of routines based on software or hardware. In this way, the application program does not need to access source code, and the developer can implement corresponding functions without understanding details of a working mechanism inside the terminal. Specifically, the API may be any API in a Linux or Windows system, for example, an API used to open a file: open{ }, an API used for writing: write{ }, or an API used to access a message queue: msgget{ }. This is not limited in this embodiment of this application.

For example, the first threshold may be 8. To be specific, when the quantity of binder threads occupied by the target application process reaches 8, there is a potential risk that binder thread resources are exhausted. Therefore, to avoid exhaustion of the binder thread resources, the processor of the terminal may further determine, by collecting statistics about the specific APIs invoked by these binder threads, whether these binder threads currently occupied by the target application are maliciously occupied.

For example, a counter may be set for each handler object, and the terminal invokes an API by invoking the handler object. Therefore, when the quantity of binder threads occupied by the target application process is greater than or equal to 8, the terminal may trigger the counter of each handler object to start counting. Each time the binder thread invokes one handler object, the counter of the handler object is increased by one. In this way, a quantity of times for which each API object is invoked may be counted.

Alternatively, the terminal may further record, in a memory, a correspondence between each binder thread and an API invoked by the binder thread. Therefore, as shown in Table 3, the terminal may collect, based on the correspondence, statistics about APIs specifically invoked by each binder thread occupied by the target application process.

TABLE 3

| Identifier of a binder thread | Identifier of an API |
|---|---|
| a | API 1 |
| b | API 1 |
| c | API 2 |

It should be noted that the quantity of binder threads occupied by the target application process may be a quantity of binder threads occupied at a same moment, or may be a quantity of binder threads occupied within a preset time period (for example, within 3 seconds). This is not limited in this embodiment of this application.

903. When a quantity of times for which an API (that is, a target API) is invoked is greater than a second threshold, the terminal stops creating a new binder thread for the target application process.

For example, the second threshold may be 16. To be specific, when a quantity of binder threads that invoke a same API (that is, a target API) is greater than 16, it indicates that the target API is under relatively heavy load, and there may be a risk that a binder thread maliciously invokes the target API. In this case, utilization of the binder thread resources is relatively high, and the binder thread frequently invokes a single API. Therefore, to avoid blocking and frame freezing caused by all occupied binder threads, when the target application process requests a binder driver to create a new binder thread, the binder driver may stop responding to the request of the target application process, set a to-be-created binder thread to a waiting state, and create a new binder thread for the target application when the binder thread resources are sufficient.

Optionally, when setting the to-be-created binder thread to the waiting state, the terminal may further insert a log (log), to record an execution state of the newly created binder thread, so that a developer can identify, based on the recorded log, a cause why the target application process encounters frame freezing.

Similarly, the quantity of times for which the target API is invoked may be a quantity of times for which the target API is invoked at a same moment, or may be a quantity of times for which the target API is invoked within a preset time period (for example, within 3 seconds). This is not limited in this embodiment of this application.

904. When the quantity of binder threads occupied by the target application process is less than the first threshold, the terminal creates a new binder thread for the target application.

After an occupied binder thread is released, the quantity of binder threads occupied by the target application process decreases. When the quantity decreases to a value less than the first threshold, it indicates that there is currently an available binder thread that can be used by the target application. Therefore, the terminal may set a state of the to-be-created binder thread from the waiting state to a creating state, to wake up the binder thread that is to be created in step 703, and start to create the binder thread.

In addition, when the binder thread occupied by the target application process is not released within a preset period of time, the to-be-created binder thread keeps in the waiting state and cannot be created. In this case, the target application process may prompt, according to an ANR (Application Not Responding, Application Not Responding) mechanism, a user whether to allow the target application process to continue running or forcibly end the target application process.

In another possible implementation, when the quantity that is of binder threads occupied by the target application process and that is counted in step 701 is greater than or equal to the first threshold, for example, when the quantity of binder threads occupied by the target application process is greater than 8, because in this case, a relatively large quantity of binder threads are occupied, in other words, there is a potential risk of exhaustion of the binder thread resources, the terminal may be directly triggered to perform step 703, that is, stop running the binder thread newly created in the target application process, set the to-be-created binder thread to the waiting state, and create a new binder thread when the binder thread resources are sufficient (for example, the quantity of binder threads occupied by the target application process is less than the first threshold). This is not limited in this embodiment of this application.

The actions of the terminal in steps 901 to 904 may be performed by the processor 101 in FIG. 1 by running an instruction or software stored in the memory 103 to instruct the terminal to complete the system service timeout processing method.

It can be understood that to implement the foregoing functions, the terminal and the like include corresponding hardware structures and/or software modules for performing the functions. A person of ordinary skill in the art should easily be aware that in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the embodiments of this application.

In the embodiments of this application, the terminal may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, module division is exemplary, and is merely a logical function division. In actual implementation, another division manner may be used.

Figure 10:
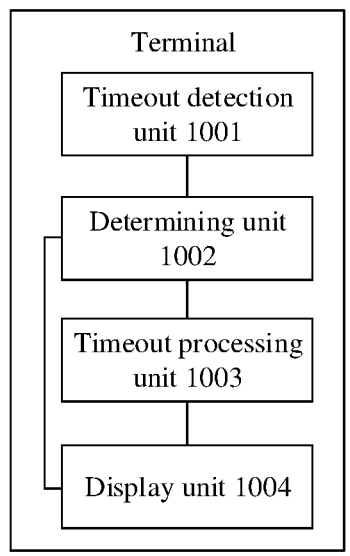
FIG. 10 is a second schematic structural diagram of a terminal according to an embodiment of this application.

When each functional module is obtained through division based on each function, FIG. 10 is a possible schematic structural diagram of the terminal in the foregoing embodiments. The terminal includes: a timeout detection unit 1001, a determining unit 1002, a timeout processing unit 1003, and a display unit 1004.

The timeout detection unit 1001 is configured to support the terminal to perform the procedure 501 in FIG. 5. The determining unit 1002 is configured to support the terminal to perform the procedures 502 and 503 in FIG. 5, the procedures 801 and 802 in FIG. 8, and the procedures 901 and 902 in FIG. 9. The timeout processing unit 1003 is configured to support the terminal to perform the procedure 504 in FIG. 5, the procedure 803 in FIG. 8, and the procedures 903 and 904 in FIG. 9. The display unit 1004 is configured to display a cause why a target system service thread times out, or display a prompt message of ending the target application process. All related content of steps in the foregoing method embodiments may be cited in function descriptions of corresponding functional modules, and details are not described herein again.

When an integrated unit is used, the timeout detection unit 1001, the determining unit 1002, and the timeout processing unit 1003 may be integrated into a processing module, and the display unit 1004 is used as a display module.

Figure 11:
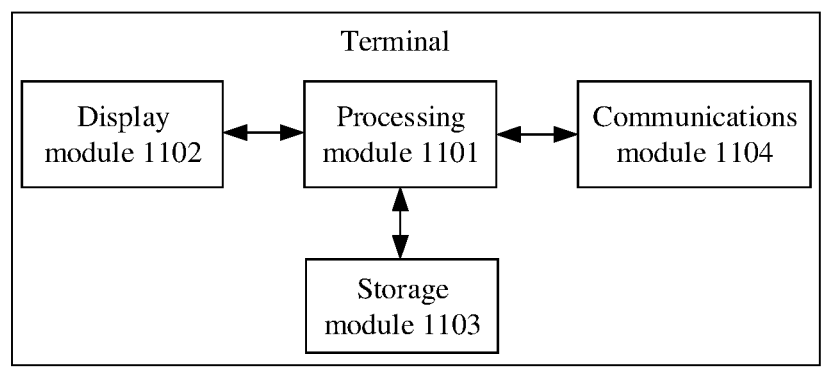
FIG. 11 is a third schematic structural diagram of a terminal according to an embodiment of this application.

In this case, FIG. 11 is a possible schematic structural diagram of the terminal in the foregoing embodiments. A processing module 1101 is configured to control and manage an action of the terminal. A display module 1102 is configured to display information input by a user or information provided for a user, and various menus of the terminal. In addition, the terminal may further include a storage module 1103 configured to store an instruction or data, a communications module 1104 configured to communicate with another terminal device, and the like.

For example, the processing module 1101 may be a processor or a controller, such as a central processing unit (Central Processing Unit, CPU), a GPU, a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logical device, a transistor logical device, a hardware component, or any combination thereof. The processing module may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The display module 1102 may be a display, and specifically, the display may be configured in a form of a liquid crystal display, an organic light emitting diode, or the like. In addition, a touchpad may further be integrated on the display, and is configured to collect a touch event on or near the display, and send collected touch information to another component (for example, a processor).

The storage module 1103 may be a memory. The memory may include a high-speed random access memory (RAM), and may further include a nonvolatile memory, for example, a magnetic disk storage device, a flash memory device, or another volatile solid-state memory.

The communications module 1104 may be a transceiver, a transceiver circuit, an input/output device, a communications interface, or the like. For example, the communications module 1303 may be specifically a Bluetooth apparatus, a Wi-Fi apparatus, a peripheral interface, or the like.

When the processing module 1101 is a processor, the communications module 1104 is a radio frequency circuit, the storage module 1103 is a memory, and the display module 1102 is a display, the terminal provided in this embodiment of this application may be the mobile phone 100 shown in FIG. 1.

All or some of the foregoing embodiments may be implemented by means of software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   when a target system service thread in at least one system service thread comprised in a system service process running on a terminal times out, determining, by the terminal, a first application process running on the terminal and communicating with the target system service thread, wherein the timeout of the target system service thread comprises: a locked object occupied by the target system service thread not being released within a preset time, or the target system service thread being blocked; and
   ending, by the terminal, the first application process;
   wherein determining, by the terminal, the first application process running on the terminal and communicating with the target system service thread comprises:
   querying, by the terminal from stored registration information, the first application process communicating with the target system service thread, wherein one or more correspondences between one or more system service threads in the at least one system service thread and one or more application processes that perform inter-process communication (IPC) are recorded in the registration information, and the one or more application processes comprise the first application process.

2. The method according to claim 1, wherein after ending, by the terminal, the first application process, the method comprises:

restarting, by the terminal, the first application process.

3. The method according to claim 1, further comprising:
monitoring, by the terminal, a total quantity N of binder threads that are currently running on the terminal, wherein N is an integer greater than or equal to zero;
in response to the total quantity N of binder threads that are currently running on the terminal being greater than a first preset value, determining, by the terminal for each of the N binder threads, an application process served by the respective binder thread;
counting, by the terminal for each application process served by at least one binder thread of the N binder threads, a quantity of binder threads occupied by the respective application process; and
in response to a quantity of binder threads occupied by a first target application process being greater than a second preset value, ending, by the terminal, the first target application process.

4. The method according to claim 3, further comprising:
ending, by the terminal, a second target application process in response to a priority of the second target application process being higher than a priority of the first target application process, wherein the priority of the second target application process is higher than the priority of the first target application process when a quantity of binder threads occupied by the second target application process is greater than the second preset value; and
restarting, by the terminal, the second target application process.

5. The method according to claim 4, further comprising:
in response to the terminal ending the second target application process, recording, by the terminal, a running progress of the second target application process; and
wherein restarting, by the terminal, the second target application process comprises:
restoring, by the terminal based on the running progress, the second target application process to a running status according the running progress.

6. The method according to claim 1, further comprising:
counting, by the terminal, a quantity M of binder threads providing an IPC service for a target application, wherein M is an integer greater than or equal to zero; and
stopping, by the terminal in response to the quantity M of binder threads being greater than or equal to a first threshold, creating a new binder thread for the target application.

7. The method according to claim 6, wherein stopping, by the terminal in response to the quantity M of binder threads being greater than the first threshold, creating the new binder thread for the target application comprises:
collecting, by the terminal, statistics about an application programming interface (API) invoked by each of the M binder threads; and
in response to a quantity of times for which a first API is invoked being greater than a second threshold, stopping, by the terminal, responding to a request of creating a new binder thread for the target application.

8. The method according to claim 6, wherein after stopping, by the terminal, creating the new binder thread for the target application, the method further comprises:
in response to the quantity M of binder threads providing the IPC service for the target application being less than the first threshold, creating, by the terminal, a new binder thread for the target application.

9. The method according to claim 1, further comprising:
displaying, by the terminal, a reason why the target system service thread timed out; or
displaying, by the terminal, a prompt message of ending the first application process.

10. The method according to claim 1, wherein the target system service thread being blocked comprises:
a duration of communication between the target system service thread and the first application process being greater than a first preset value; or
a suspension duration of the target system service thread in an execution procedure being greater than a second preset value.

11. An electronic device, comprising:
at least one processor; and
a non-transitory memory coupled to the at least one processor and configured to store programming instructions that, when executed by the at least one processor, cause the electronic device to perform operations comprising:
in response to a target system service thread in at least one system service thread comprised in a system service process running on the electronic device timing out, determining a first application process running on the electronic device and communicating with the target system service thread, wherein the timeout of the target system service thread comprises: a locked object occupied by the target system service thread not being released within a preset time, or the target system service thread being blocked; and
ending the first application process;
wherein determining the first application process running on the electronic device and communicating with the target system service thread comprises:
querying, from stored registration information, the first application process communicating with the target system service thread, wherein one or more correspondences between one or more system service threads in the at least one system service thread and one or more application processes that perform inter-process communication (IPC) are recorded in the registration information, and the one or more application processes comprise the first application process.

12. The electronic device according to claim 11, wherein the operations further comprise:
restarting the first application process.

13. The electronic device according to claim 11, wherein the operations further comprise:
monitoring a total quantity N of binder threads that are currently running on the electronic device, wherein N is an integer greater than or equal to zero;
in response to the total quantity N of binder threads being greater than a first preset value, determining, for each of the N binder threads, an application process served by the respective binder thread;
for each application processed served by at least one binder thread of the N binder threads, counting a quantity of binder threads occupied by the respective application process; and
in response to a quantity of binder threads occupied by a first target application process being greater than a second preset value, ending the first target application process.

14. A non-transitory computer readable medium configured to store instructions that, when executed by at least one processor of an electronic device, cause the electronic device to perform operations comprising:

in response to a target system service thread in at least one system service thread comprised in a system service process running on the electronic device timing out, determining a first application process running on the electronic device and communicating with the target system service thread, wherein the timeout of the target system service thread comprises: a locked object occupied by the target system service thread not being released within a preset time, or the target system service thread being blocked; and ending the first application process;

wherein determining the first application process communicating with the target system service thread comprises:

querying, from stored registration information, the first application process running on the electronic device and communicating with the target system service thread, wherein one or more correspondences between one or more system service threads in the at least one system service thread and one or more application processes that perform inter-process communication (IPC) are recorded in the registration information, and the one or more application processes comprise the first application process.

15. The non-transitory computer readable medium according to claim 14, wherein the operations further comprise:

restarting the first application process.

16. The non-transitory computer readable medium according to claim 14, wherein the operations further comprise:

monitoring a total quantity N of binder threads that are currently running on the electronic device, wherein N is an integer greater than or equal to zero;

in response to the total quantity of binder threads being greater than a first preset value, determining, for each of the N binder threads, an application process served by the respective binder thread;

for each application served by at least one binder thread of the N binder threads, counting a quantity of binder threads occupied by the respective application process; and in response to a quantity of binder threads occupied by a first target application process being greater than a second preset value, ending the first target application process.

17. The non-transitory computer readable medium according to claim 16, wherein the operations further comprise:

ending a second target application process in response to a priority of the second target application process being higher than a priority of the first target application process, wherein the priority of the second target application process is higher than the priority of the first target application process when a quantity of binder threads occupied by a second target application process is greater than the second preset value; and restarting the second target application process.

18. The method according to claim 1, wherein the system service process further comprises a watchdog thread; and wherein the method further comprises:

before determining the first application process running on the terminal and communicating with the target system service thread, determining, by the terminal, through the watchdog thread, that the target system service thread times out.

\* \* \* \* \*